Nov. 14, 1950 — L. ROSEN — 2,530,179
SWIVEL CLAMP FOR SUBMERGIBLE ELECTRIC CABLES
Filed Dec. 29, 1945 — 2 Sheets-Sheet 2
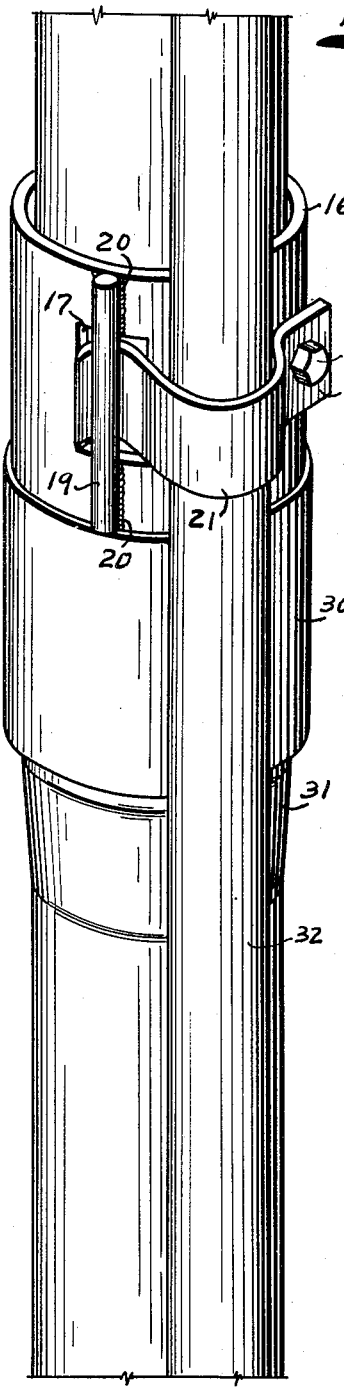
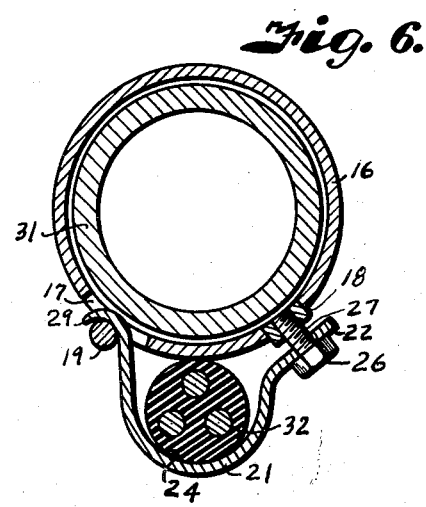
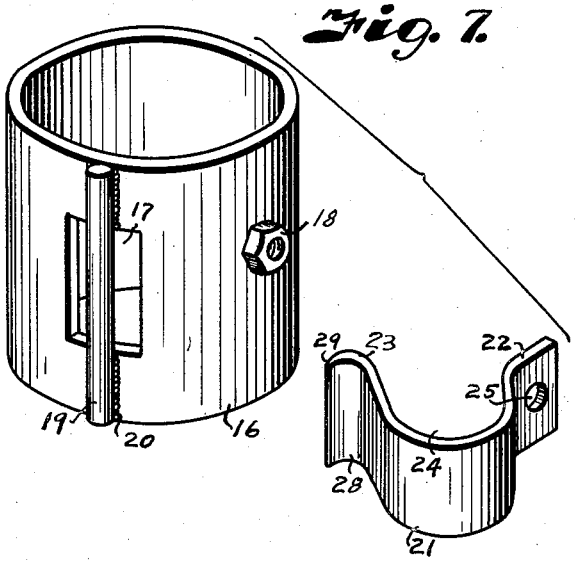
INVENTOR
Leo Rosen.
BY
Fishburn & Mallendore,
ATTORNEYS Patented Nov. 14, 1950

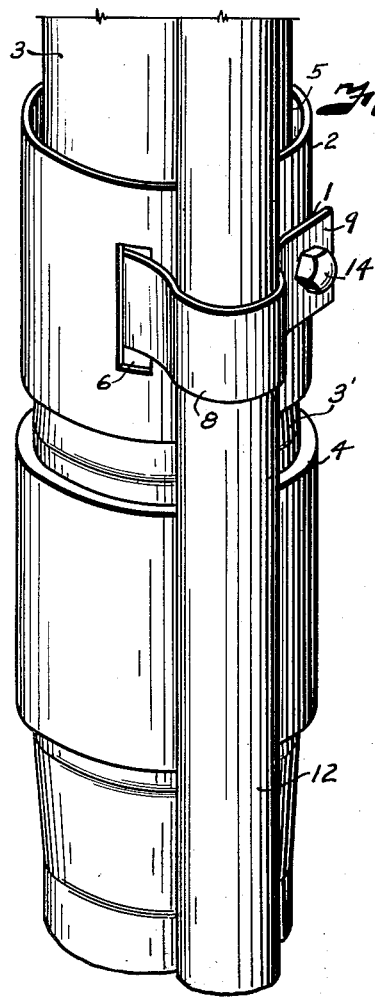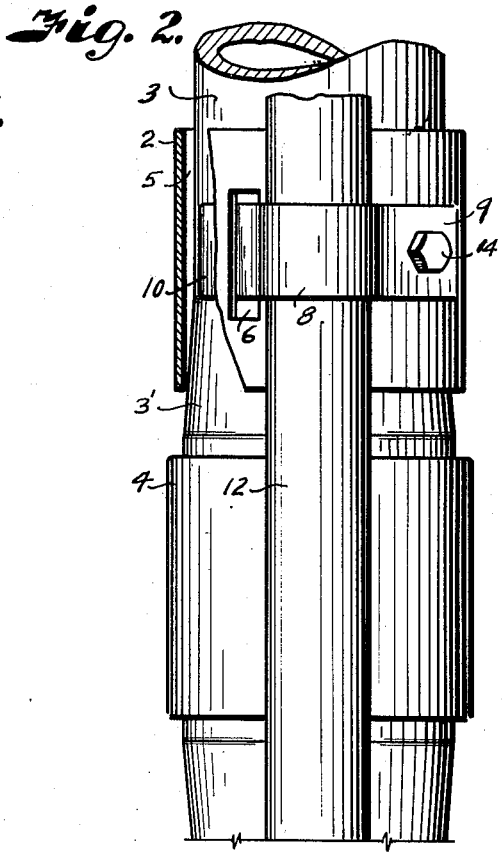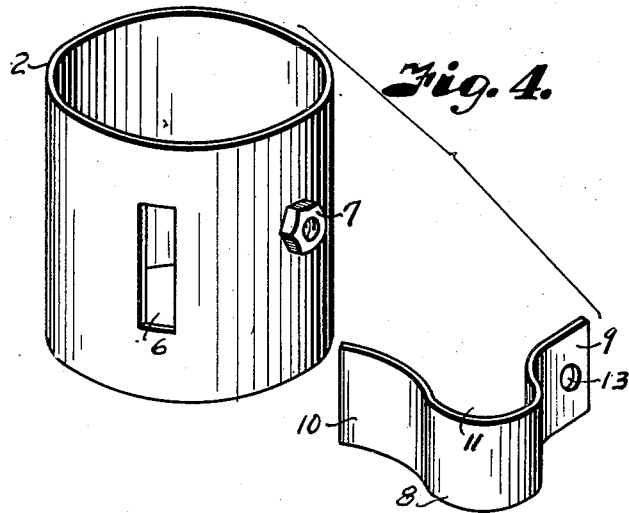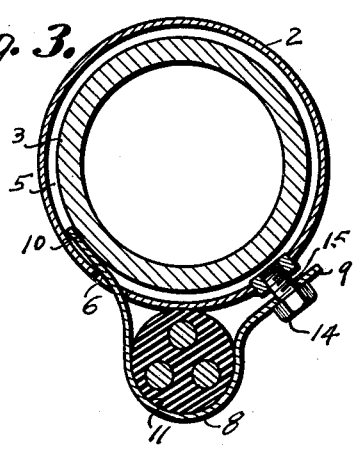
INVENTOR
Leo Rosen
BY
Fishburn & Mullendore,
ATTORNEYS.

2,530,179

UNITED STATES PATENT OFFICE 2,530,179

SWIVEL CLAMP FOR SUBMERGIBLE ELECTRIC CABLES

Leo Rosen, Oklahoma City, Okla.

Application December 29, 1945, Serial No. 638,084

2 Claims. (Cl. 248—74)

1

This invention relates to swivel clamps for submergible electric cables, and more particularly to a clamp to support electric cable or hydraulic power pipe to a string of tubing or the like used in a well hole.

The principal objects of the present invention are to provide a clamp which may be quickly and easily applied to the string of tubing as the tubing is being lowered into a well hole; to provide a device simple in operation for this purpose; to provide a device which will hold the cable in place along the tubing and not become displaced therefrom; and to provide a device economical to manufacture and efficient in operation.

In accomplishing these and other objects of the invention, I have provided improved details of structure, the preferred form of which is illustrated in the accompanying drawings, wherein:

Fig. 1 is a perspective view of the clamp attached to a string of tubing.

Fig. 2 is a perspective view of the clamp with part of the retaining ring broken away to better illustrate the invention.

Fig. 3 is a transverse cross section through the device attached to the tubing.

Fig. 4 is a perspective view of the retaining ring and clamp shown in disassembled relation.

Fig. 5 is a perspective view of a modified form of the clamp shown attached to the tubing.

Fig. 6 is a transverse cross section through the device as it is applied to the tubing.

Fig. 7 is a perspective view of the retaining ring and clamp shown in disassembled relation.

Referring more in detail to the drawings:

1 designates a clamp embodying the features of my invention which comprises a steel ring 2 adapted to fit over a tubing 3 having upset ends 3' and provided with the usual collar 4. The ring 2 is cylindrical in form and of slightly larger diameter than the tubing as indicated at 5 (Fig. 3). The ring is provided with a slot 6 at substantially equidistance between the respective edges of the ring and opposite the slot approximately one-fourth the distance around the ring is an opening in which is secured an internally threaded nut 7. The nut 7 may be secured in the opening by welding or other suitable means.

The clamping portion proper consists of a strip of material, preferably metal, bent to form a loop portion 8 having outwardly extending arms 9 and 10. The loop portion 8 forms a socket 11 adapted to engage a Reda cable or the like 12. The arm 10 of the clamp member is adapted

2 to engage in the slot 6 of the steel ring and the arm 9 is provided with an opening 13 adapted to receive a stud bolt 14 having a threaded shank 15 adapted to engage in the threaded nut 7 secured in the steel ring 2.

Assembly of a device constructed as described is as follows:

The tubing may be lowered in the well and the device is adapted to work on either upset or plain tubing. The steel ring 2 is slipped over the threaded end of the tubing when going in the hole and the ring will rest on the coupling 4 while the joint is being made up. The cable 12 is placed in the hole alongside the tubing and the cable held against the ring 2. The arm 10 is then inserted in the slot 6 of the ring and the clamp portion inserted over the cable so that the loop portion 11 will fit the cable and the stud bolt 14 is then inserted through the opening 13 of the arm 9 and the shank 15 threaded into the threaded nut 7 on the ring 2. When thus made up the cable is held against the ring which is raised above the upset or collar. When the clamp portion is bolted down the cable will be held securely to the ring.

Referring to the form of invention shown in Figs. 5, 6 and 7, I have illustrated a clamp comprising a ring 16 having a slot 17 and an internally threaded nut 18 offset therefrom substantially one-fourth distance around the ring as illustrated in the form of invention shown in Figs. 1, 2, 3 and 4. A rod 19 of substantially equal length of the ring 16 is welded to the ring over the slot 17 as indicated at 20 (Fig. 5).

The clamping member of the clamp in this form of the invention is also made of a strip of metal having a loop portion 21 and outwardly extending arms 22 and 23, the loop portion 21 forming a socket 24 for the Reda cable as later described. The arm 22 is provided with an opening 25 adapted to receive a stud bolt 26 having a threaded shank 27 adapted to engage in the threaded nut 18 on the ring 16 as in the form of invention shown in Figs. 1, 2, 3 and 4. The arm 23 is curved outwardly and slightly upwardly to form a socket 28 adapted to engage the rod 19 as later described. The outer edge of the arm 23 is tapered as indicated at 29.

Assembly of the device constructed as described is as follows:

The ring 16 is slipped over the threaded end of the tubing as in the preferred form of the invention and comes to rest on the collar 30 of the upset tubing 31. The edge 29 of the arm 23 is then inserted in the slot 17 under the rod 19 so that the rod will engage in the socket 28 of the arm 23. The Reda cable 32 or other object to be clamped to the pipe is then placed alongside the tubing and the socket 24 of the clamp placed therearound and the arm 22 secured to the ring 16 by the stud bolt 26 also as in the preferred form of the invention.

The slots 6 and 17 in the respective forms of the invention are of slightly greater width than the strap or clamp member to provide easy insertion of the strap member in the slot.

It will be obvious from the foregoing that I have provided an improved clamp for attaching a Reda cable or hydraulic power string to a string of tubing in a well hole, or for other use, which may be quickly and easily applied to the tubing and which will securely hold the cable to the tubing while in use.

What I claim and desire to secure by Letters Patent is:

1. A swivel clamp for attaching submergible electric cables to a string of upset ended well pipe sections comprising, a cylindrical tubular ring adapted to be sleeved over the upset ends of the pipe sections and be rotatable and slidable on said sections between the upset ends, said ring having a slot in one side thereof, a strap-like member adapted to embrace a cable arranged longitudinally of the pipe sections and having an extension at one end engaging in the slot, and means securing the other end of the strap-like member to the ring for holding the cable to the ring.

2. A swivel clamp for attaching submergible electric cables to a string of well pipe having a plurality of couplings connecting upset ends of pipe sections comprising, a cylindrical tubular ring adapted to be sleeved over the upset ends of the pipe sections and be rotatable and slidable on said sections between said upset ends, said ring having a longitudinal slot in one side thereof, a threaded socket in said ring spaced circumferentially from the slot, a strap-like member adapted to embrace a cable arranged longitudinally of the pipe sections and having an extension at one end for extending through the slot and between the pipe sections and ring for engaging the inner face of said ring, said extension permitting the ring to rotate and move longitudinally on the pipe sections between the upset ends and preventing movement over said upset ends, and means engaging the other end of said strap-like member and the threaded socket for providing tension on said strap-like member to hold the cable to the ring.

LEO ROSEN.

REFERENCES CITED

The following references are of record in the file of this patent:

UNITED STATES PATENTS

| Number | Name | Date |
| --- | --- | --- |
| 376,659 | Kelly | Jan. 17, 1888 |
| 378,256 | Lee | Feb. 21, 1888 |
| 2,351,858 | Ingalls | June 20, 1944 |
| 2,394,518 | Kindorf | Feb. 5, 1946 |